(No Model.)
F. K. COLE.
HITCHING DEVICE.
No. 535,319. Patented Mar. 5, 1895.
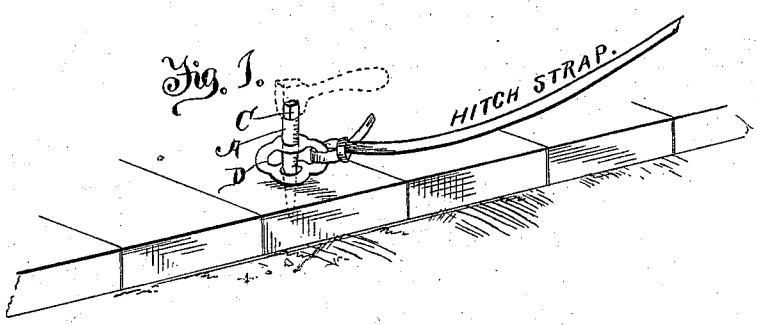
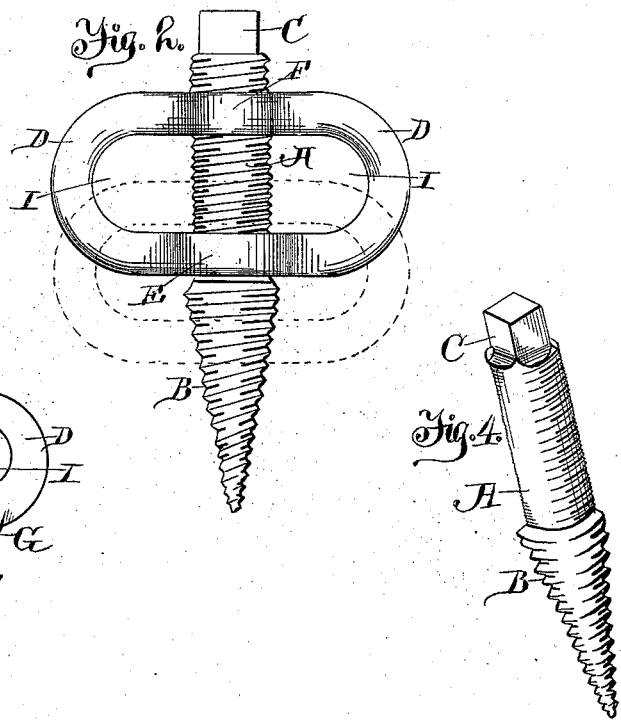
Witnesses:
L. Schaeffer
W. A. Richison
Inventor:
F. K. Cole.
By C. E. Adamson
Atty.

UNITED STATES PATENT OFFICE.

FRANK KELLOGG COLE, OF MUNCIE, INDIANA.

HITCHING DEVICE.

SPECIFICATION forming part of Letters Patent No. 535,319, dated March 5, 1895.

Application filed April 17, 1894. Serial No. 507,831. (No model.)

*To all whom it may concern:*

Be it known that I, FRANK KELLOGG COLE, a citizen of the United States, residing at Muncie, in the county of Delaware and State of Indiana, have invented certain new and useful Improvements in Hitching Devices; and I do hereby declare the following to be a full, clear, and exact description of the invention, such as will enable others skilled in the art to which it appertains to make and use the same.

My invention relates to that class of hitching devices that are made attachable and detachable to some solid body by being driven or screwed into a solid surface, such as wood, or into a crack or crevice in stone or brick walls, &c., and the objects are to construct a simple and compact device small enough to be carried in the pocket, and so arranged that it may be attached and detached to an object by using a small ordinary wrench. I attain these objects by the mechanism illustrated by the accompanying drawings, in which—

Figure 1 is a perspective view, showing my post attached to the edge of a board walk and a portion of one end of a hitching strap attached. Fig. 2 is an elevation of my complete invention not attached to anything; and Figs. 3 and 4 are detail views of the two parts of my invention separated from each other.

Similar letters refer to similar parts throughout the several views.

My invention consists of two parts, a screw pointed metal post and a threaded eye or link that is adjustably secured to the said post. The post consists of a threaded shank A, a tapering screw point B and a square ended head C, most clearly shown in Fig. 4. The eye D is made in a link shape having two swelled sides E and F through which are holes G and H, whereby the said eye is made to work on the post longitudinally. The hole H in the eye is threaded to correspond with the threads on the shank A and the hole G is not threaded but made larger than the hole H so that it will pass over the screw point B in adjusting and turning it on the post. The openings I I in the eye D are large enough to admit of a hitching strap being inserted in them, as shown in Fig. 1.

The operation of my invention is as follows: When it is desired to secure the post to some solid object, such as a board walk, where there is no regular hitching post available, I first turn the eye up on the shank as shown in Fig. 2, then drive with a small wrench, such as a carriage wrench, the post into the solid wood or into a crevice between the boards a short distance, and apply the wrench to the end C, as indicated by the dotted lines in Fig. 1, and turn the post until it is firmly secured, then turn the eye D down on the shank as indicated by dotted lines in Fig. 2, until the side E rests firmly down on the surface. As thus secured, the hitching strap may be attached to the eye, as shown in Fig. 1, and the device is solid and secure until the wrench is applied and the post turned backward and withdrawn.

The eye D serves two purposes. One is that when the post is inserted into an object, the enlarged under side E of the eye serves as a shoulder to the post so that it can not work sidewise and become loose, and then the eye also serves as a receptacle to which the hitching strap is secured.

I do not confine myself to any particular shape of the point B, as such matter is shown and described in the patents to Reverdy B. Stewart, Nos. 418,541 and 460,094, of which I am owner by assignments.

Having thus described my invention, I claim the following and desire to secure the same by Letters Patent:

In a hitching device, the combination with a post having a head, a threaded tapering end portion B forming a point and a screw threaded shank A having straight sides, of an elongated eye on the post having an aperture in its lower side portion, the aperture having a diameter greater than the diameter of the tapering portion B and adapted to loosely encircle the tapering portion, and a screw threaded aperture in its upper side portion adapted to engage the screw threads on the shank, substantially as described.

In testimony whereof I affix my signature in presence of two witnesses.

FRANK KELLOGG COLE.

Witnesses:
E. J. TOMLINSON,
E. E. DAUGHERTY.